United States Patent
Rukes

(10) Patent No.: US 8,547,439 B2
(45) Date of Patent: Oct. 1, 2013

(54) TESTING AN OPTICAL CHARACTERISTIC OF A CAMERA COMPONENT

(75) Inventor: Jason R. Rukes, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/403,852

(22) Filed: Feb. 23, 2012

(65) Prior Publication Data

US 2013/0222605 A1    Aug. 29, 2013

(51) Int. Cl.
*H04N 17/00*    (2006.01)

(52) U.S. Cl.
USPC ............................ 348/187; 348/188

(58) Field of Classification Search
USPC ................... 348/180, 187, 181, 188
IPC ........................... H04N 17/00, 17/02
See application file for complete search history.

(56) References Cited

U.S. PATENT DOCUMENTS

| | | | |
|---|---|---|---|
| 4,829,331 A | 5/1989 | Aihara | |
| 5,991,004 A | 11/1999 | Wallace et al. | |
| 6,463,214 B1 | 10/2002 | Nakata | |
| 7,310,109 B2 * | 12/2007 | Dottling et al. | ............... 348/187 |
| 2004/0189812 A1 | 9/2004 | Gustavsson et al. | |
| 2005/0286026 A1 | 12/2005 | Matsumoto et al. | |
| 2007/0076981 A1 | 4/2007 | Ojanen | |
| 2007/0115429 A1 | 5/2007 | Divo | |
| 2007/0115457 A1 | 5/2007 | Matsuzawa et al. | |
| 2007/0211912 A1 | 9/2007 | Tai et al. | |
| 2008/0124068 A1 | 5/2008 | Kwon et al. | |
| 2008/0316470 A1 | 12/2008 | Lei | |
| 2010/0128144 A1 | 5/2010 | Tay | |
| 2010/0194971 A1 | 8/2010 | Li et al. | |

* cited by examiner

*Primary Examiner* — Sherrie Hsia
(74) *Attorney, Agent, or Firm* — Blakely, Sokoloff, Taylor & Zafman LLP

(57) ABSTRACT

A camera module under test is signaled to capture an image of a target. A group of pixels of the image that represent portions of several objects in the target are low pass filtered and then analyzed to compute a pixel distance between different subgroups of pixels that represent portions of the different objects. The computed pixel distance is then converted into a true distance using a predetermined math relationship that relates a pixel distance variable with a true distance variable.

17 Claims, 3 Drawing Sheets

TESTING AN OPTICAL CHARACTERISTIC OF A CAMERA COMPONENT

This disclosure relates to a method for testing an optical characteristic of a camera component, using image processing techniques. Other aspects are also described.

BACKGROUND

The ability of a camera to produce a photograph that faithfully depicts a scene is governed in large part by its optical performance. With respect to modern consumer electronic devices, such as portable computers (laptops, tablet computers, and smart phones), as well as in desktop computers, improvements in image quality have been achieved together with the use of higher megapixel image sensors that are being incorporated into relatively small or tightly confined spaces within the housing of the consumer electronics device. As the dimensions of the optical components shrink, including, for instance, the imaging lens itself and its distance to an image sensor at the focal plane, the photograph produced by the camera becomes more susceptible to slight deviations in position and alignment of the optical system components. For instance, slight changes in the alignment of a lens relative to the optical axis and relative to the image sensor can result in image quality degradation. Such misalignments can occur during manufacturing and, in particular, during component assembly of a camera module in which the lens may be integrated.

There are several technical variables that can be used to evaluate the optical performance of a camera based on the quality of the resulting photograph of picture. For instance, there are image processing techniques to measure the sharpness of a photograph. Sharpness is also typically monitored during an auto-focus process in which a sharpness value is calculated over a number of different image captures or frames, as the distance between a camera lens and a plane of the image sensor is changed. The auto-focus process, of course, attempts to find the optimum location of a moveable lens along the z-axis (optical axis) that yields the sharpest captured image. Another optical characteristic that is often evaluated is distortion, that is whether a geometric shape of the object has been distorted (e.g., where a straight line appears slightly curved).

There are measurements of optical characteristics that are performed on a camera component, such as a lens, during manufacture testing, to ensure that the specimens released to end users are within a given performance specification. One characteristic that is tested is that of optical tilt. The camera component is installed in a test fixture while aligned with a target test pattern, and high precision mechanical measurement components including a laser light source and mirrors are used together with the needed automatic test equipment to mechanically measure the tilt of the camera component.

SUMMARY

There are times when it is desirable to know whether or not a lens has been inadvertently moved relative to a test fixture or relative to a camera component housing in which it has been installed. This information is useful when testing the optical characteristics of the camera component, particularly during manufacture testing, to inform the decision as to whether the lens itself has a defect or whether the resulting subpar imaging performance is due to an unintentional shift in the position of the lens relative to the image sensor. For instance, when testing a camera module that will be installed into a consumer electronic device, such as a smart phone or a tablet computer, a lens assembly may be installed in the module prior to a verification test of the optical or imaging performance of the module. Because of the relatively small dimensions of such a camera module, small shifts or changes in the position of the lens will impact the results of a test which evaluates, for instance, the sharpness performance of the camera module. In particular, during manufacturing of an autofocus camera module, it may be that the test fixture used for checking the autofocus functionality inadvertently injects inaccuracies in the form of small, undesired changes in the distance between an autofocus lens and the image sensor. Such events may be more of a concern for high volume manufacture specimens of the camera module which need both low cost and efficient testing procedures. It has been found that a technique is needed to determine when such an event has occurred, and how much the lens distance has changed. It should be noted that a dedicated precision distance measurement tool (that could easily measure the distance between the lens and the image sensor) is not practical at this assembly stage of manufacture since the camera module is quite compact in the case of certain consumer electronic devices (e.g., smart phones and tablet computer), and as such cannot be easily fitted with such a mechanical measurement tool.

In accordance with an embodiment of the invention, a method for testing an optical characteristic of a camera component proceeds as follows. An imaging target having a number of objects (e.g., an edge pattern) therein is brought into the field of view of a camera component, such as a consumer electronic camera module. A digital image of the objects that appear in the target is then captured (based on an optical image of the objects that has been formed through the camera component). A group of pixels of the digital image that represent portions of the objects is low pass filtered. The filtered group of pixels is then analyzed to compute a pixel distance between a first subgroup of pixels that represents a portion of one of the objects, and a second subgroup of pixels that represents a portion of another one of the objects. The pixel distance is then converted into a true distance (e.g., in units of microns), using a predetermined math relationship, where the latter relates a pixel distance variable with a true distance variable. The true distance variable gives the distance, e.g. in units of microns, between a lens of the camera component and a digital image sensor that is used to capture the image.

In one embodiment, a baseline or initial distance is computed just after a camera component (device under test) has been installed in a test fixture. Some time later, a new distance is computed (using the same camera component), for example during an on-going manufacture test process for the component. An alert may then be signaled if the difference between the baseline and new distance values is greater than a predetermined threshold. The alert may be used to inform a subsequent decision on whether or not the camera component that is currently installed in the test fixture has shifted sufficiently so that an imaging performance test should be repeated, with the component at its current position.

To further improve accuracy, during the analysis of the captured image, the filtered group of pixels may be analyzed by calculating a centroid of the first subgroup, and a centroid of the second subgroup of pixels, where the computed pixel distance is taken as the distance between the centroids.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
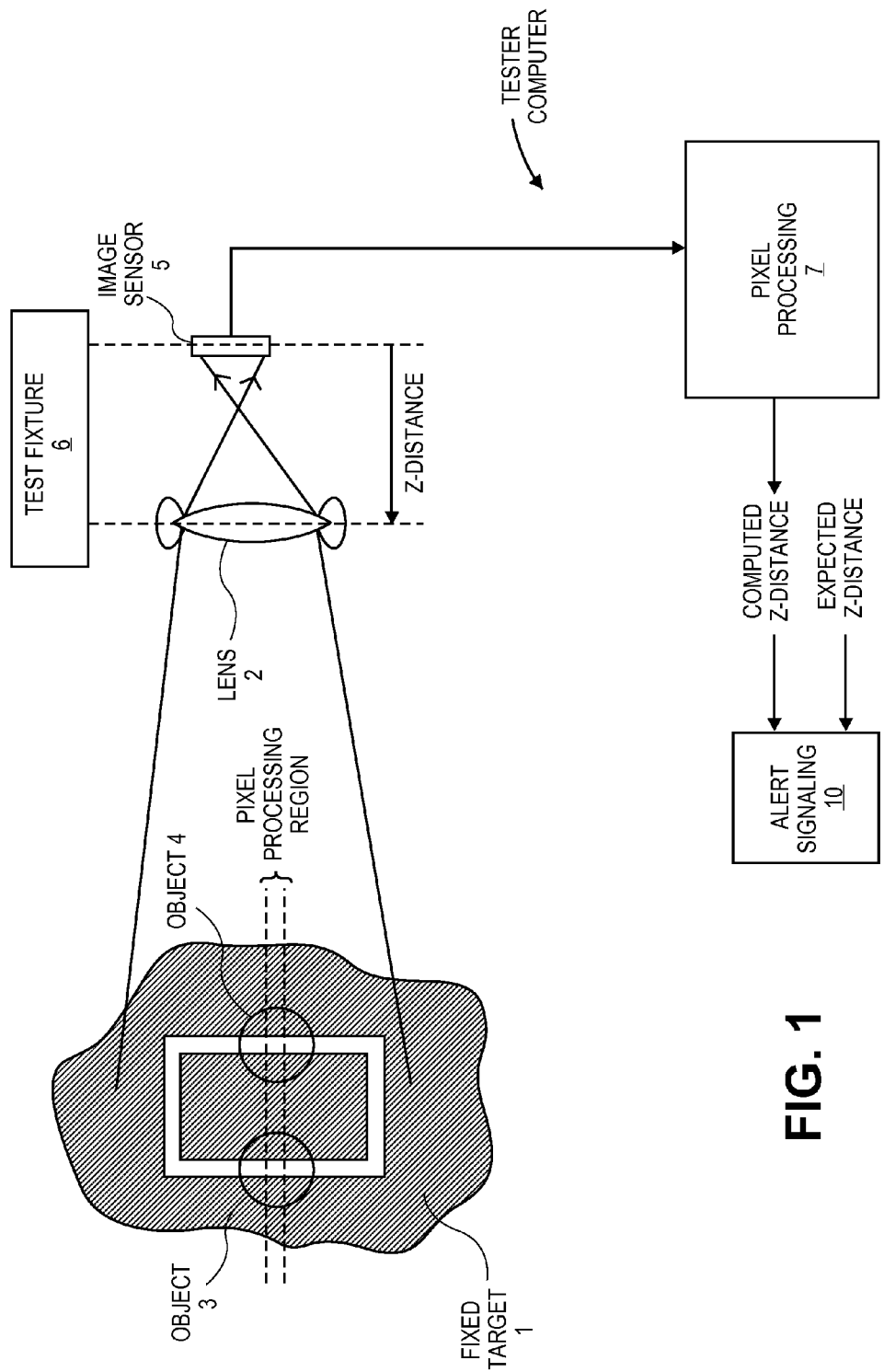
FIG. 1 is a block diagram of a system for testing an optical characteristic of a camera component.

FIG. 1 is a block diagram of a system for testing an optical characteristic of a camera component. The camera component in this case is a lens 2, which is an imaging lens that has been fixed in a lens holder. The lens holder and the lens 2 may be installed in a test fixture 6 in which an image sensor 5 has also been installed. In this arrangement, the image sensor 5 is also referred to as a focal plane imaging sensor because it is at a focal plane of an optical system that includes the lens 2 and that can capture a picture (still or video) of a scene which contains, in this case, a fixed target 1. The lens 2 and the image sensor 5 may be in different pieces that have been combined into a single assembly referred to as a camera module. The camera module may be one that is typically found in multi-function consumer electronic devices that have camera functions, such as smart phones, tablet computers, desktop computers, and home entertainment systems. There may also be other optical components that are integrated with the lens 2 and the image sensor 5 within a frame forming the single assembly of the camera module. Examples include optical filters and apertures.

The camera module may be a device under test (DUT), and in particular a high volume manufacture specimen; in that case, the test fixture 6 is a hardware arrangement in a manufacturing setting. As an alternative, the test fixture 6 may be in a development laboratory setting, or even in a post manufacturing product return and testing center. The test fixture 6 should be designed to precisely fix and align the DUT relative to the fixed target 1, enabling the image sensor 5 to be used to capture images of the target 1 for evaluating the optical performance of the DUT.

The fixed target 1 has several objects including object 3 and object 4, for instance, and is located such that the camera component DUT as installed is aimed at the target as shown. The target 1 may be at a predetermined distance from the installed camera component. Each object 3, 4 may be any dark-light contrasting region, e.g. an edge, which will be captured by the image sensor 5. The target 1 may have different objects that are suitable for testing the optical performance of an imaging system, but in this example the objects 3, 4 are opposite portions of a rectangular light frame on a dark background. An image of at least a part of this frame is to be captured by the image sensor 5, and an example pixel processing region as shown in FIG. 1 is selected in the captured image, to be evaluated by a tester computer.

The tester computer may include the following elements. Note that the tester computer may be any suitable computing or data processing system (which includes, typically, a processor and memory combination) that is programmed to signal the image sensor 5 to capture an image of the target 1 and particularly the objects 3 and 4 therein, and then feeds the image data to its pixel processing unit 7. The latter performs various math operations to estimate or compute a measure of a z-distance, which is indicated in the example of FIG. 1 as the distance between the lens 2 and the focal plane image sensor 5 along the horizontal center optical axis of the camera component. The test computer may also include an alert signaling unit 10 that evaluates the computed z-distance, by for instance comparing it with an expected z-distance or other comparison threshold; if the comparison indicates that the computed z-distance is sufficiently different than a threshold than an alert is signaled or an error log is updated with an indication that the current camera component under test may be non-conforming or may have been shifted from its initial positioning.

Figure 2:
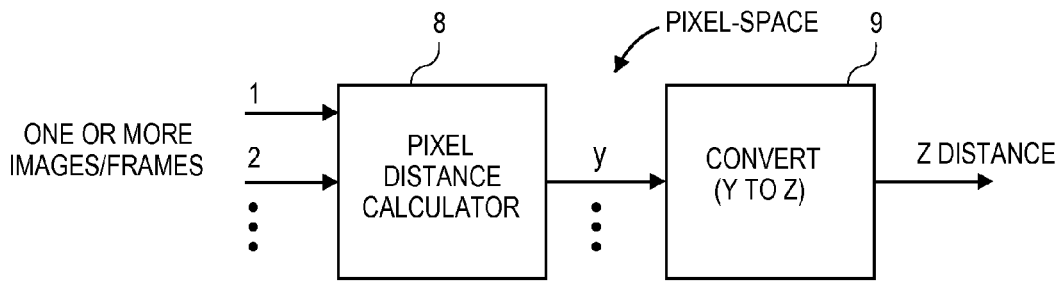
FIG. 2 depicts details of the pixel processing block that may be used to compute the z-distance of a camera component.

FIG. 2 gives additional details of the pixel processing unit 7. One of the tasks of the pixel processing unit 7 is to compute the pixel distance between the two objects 3, 4 that are depicted in a given captured image or frame, and to convert the calculation from pixel space to true distance. Accordingly, a pixel distance calculator 8 is shown that receives one or more captured images or frames from the image sensor 5, and analyzes the pixels in the frame to compute a pixel distance between its detected object 3 and object 4. The pixel distance calculator may also include a detection operation, where an incoming image is analyzed to first detect the objects 3, 4, that is identify a group of pixels representing each object or edge.

Figure 3:
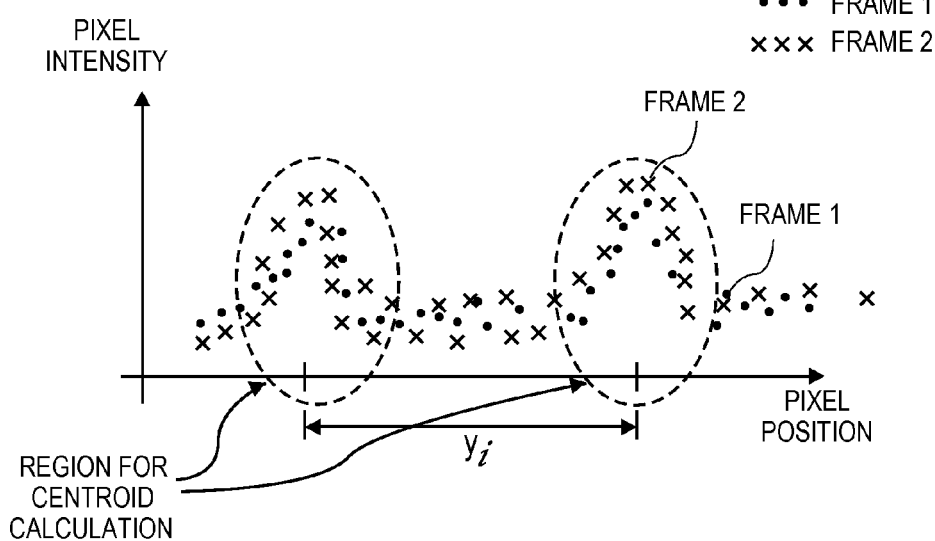
FIG. 3 shows plots of pixel intensity versus pixel position that have been captured by the image sensor for an example test target.

Having identified the group of pixels in which the objects 3, 4 are contained, these pixels are then low pass filtered or smoothed, before performing an analysis that computes a pixel distance value $y_i$. FIG. 3 shows an example graph of pixel intensity versus pixel position for a group of pixels, in two different frames taken from the same target 1. The process described here may thus be performed on more than one frame, and some form of averaging or statistical combination may then be performed in order to obtain a single value of the pixel distance $y_i$. The graph shown in FIG. 3 reflects the objects depicted in FIG. 1 following low pass filtering. The pixel intensity begins, at the left, with relatively low values, and then increases to high values (corresponding to a light region) and then drops back down to the low values (corresponding to the dark region) within the frame, and then repeats for the second object. The pixel distance calculator 8 performs an analysis upon the filtered group of pixels (based on the indicated pixel processing region) in order to compute the pixel distance $y_i$ that is between a first subgroup of pixels that represents a portion of object 3 and a second subgroup of pixels that represents a portion of object 4. Any suitable pixel processing algorithm may be selected that can compute the pixel location of an approximate peak intensity value for each pixel subgroup. However, it has been found that the analysis should first include the calculation of a centroid of each subgroup, such that the pixel distance $y_i$ is computed as being the distance between or separating the two centroids. Such a calculation for the pixel distance $y_i$ may be repeated for more than one frame and perhaps then averaged or otherwise statistically combined to form a single value.

Returning briefly to FIG. 1, it can be seen that a pixel processing region which contains the group of pixels to be analyzed may be defined by a selected number of pixel rows of the captured image that are expected to contain the detected objects 3, 4. Here, the term "row" is being used generically and for convenience, to alternatively refer to a column of pixels. The low pass filtering may produce a single row of pixel values (see FIG. 3 for instance) that are expected to contain portions of the detected objects 3, 4. While row processing may enable more efficient mathematical processing of pixel intensity and pixel position values, the pixel processing region may be defined differently, e.g. along a diagonal for instance.

Figure 4:
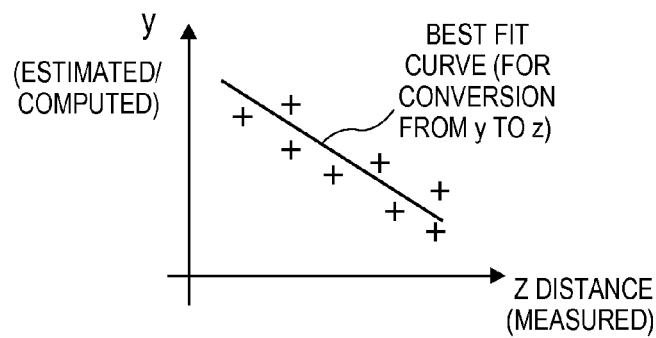
FIG. 4 depicts the general form of an example math relationship that relates a pixel distance variable (y-axis) with a lens position or true distance variable (x-axis).

Returning to FIG. 2, a further element of the pixel processing unit 7 is a conversion unit 9 which serves to convert a computed pixel distance $y_i$ into a true z-distance value, using a predetermined math relationship that relates a pixel distance variable (pixel coordinate space) with a true distance variable (distance coordinate space, e.g. microns). The math relationship may have been predetermined by collecting several direct physical measurements of true distance (between, for example, the lens 2 of a specimen of a camera component design that is to be tested, and the image sensor 5), together with corresponding computed/estimate pixel distance values, and then analyzing the collected data to find a best-fit curve. The results of such a process are depicted in FIG. 4 by an example graph of estimate pixel distance $y_i$ values versus measured z-distance. The resulting best-fit curve in this instance is a two-dimensional linear curve, namely a line, which can be described by a linear equation. Of course, a non-linear curve or a curve containing non-linear sections may also be used. The best-fit curve is then stored in the tester computer (see FIG. 1) and then reused when testing other specimens of the same camera component design or the same camera component specification, for converting from a calculated pixel space value to a true distance value. As suggested above, this true distance may be an accurate estimate of the distance along the optical axis between the lens 2 and the focal plane image sensor 5 (see FIG. 1).

Figure 5:
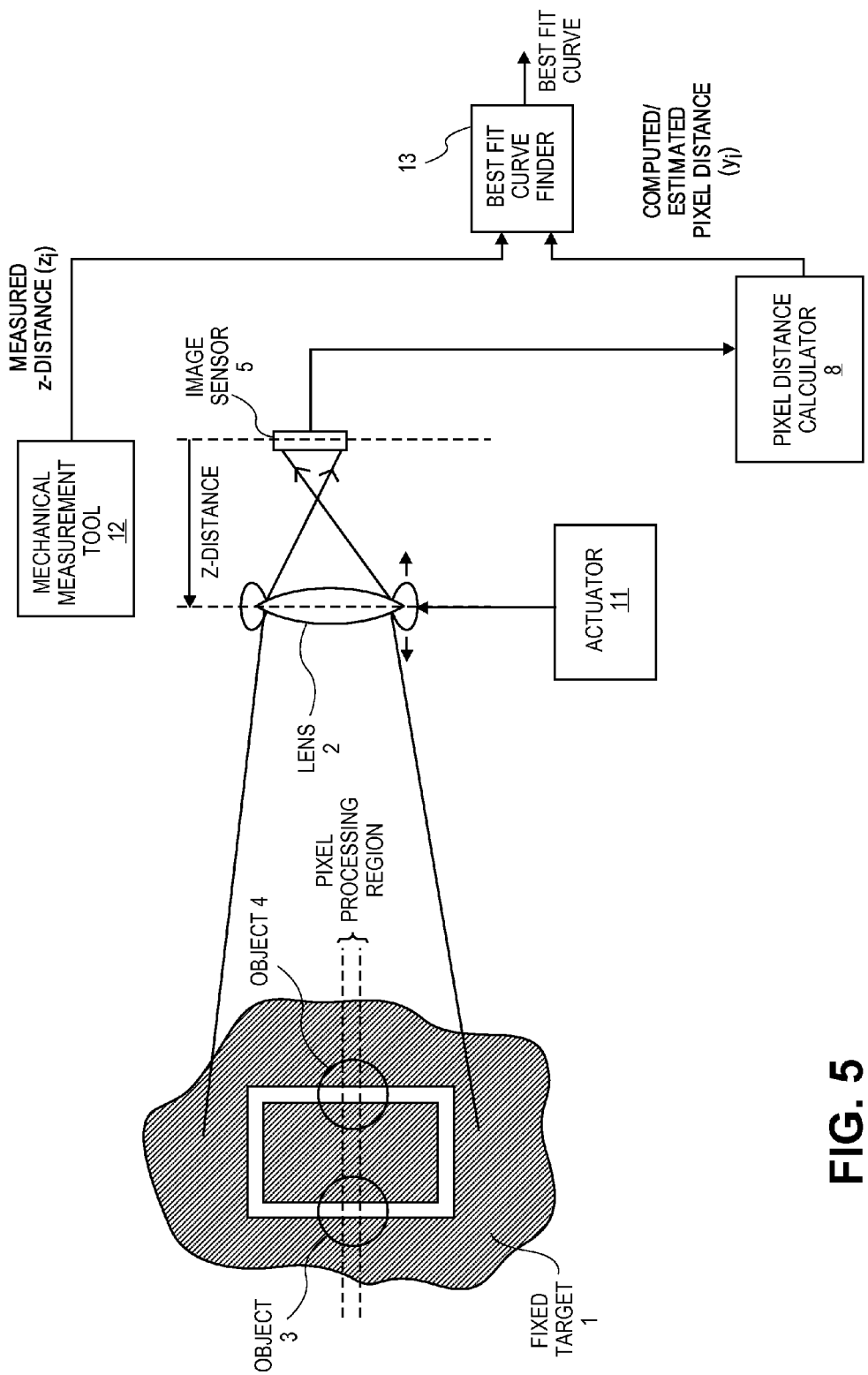
FIG. 5 is a block diagram of a system for obtaining a best fit curve as an example of the math relationship between computed pixel distance variable and a z-distance variable.

FIG. 5 is a block diagram of a system for obtaining the best-fit curve, which is the math relationship that is needed to relate a computed pixel distance variable and a true z-distance variable. The setup in FIG. 5 may be similar to that of FIG. 1 in that a camera component having the same design or specification as the device under test (including the same design or spec for the lens 2 and the image sensor 5) is installed within a test fixture, and is aimed at the fixed target 1. This arrangement may be the same as that which will be subsequently used, in accordance with FIG. 1, for performing high volume manufacture testing of the actual production specimens of the camera component design. The system in FIG. 5 is also fitted with a mechanical measurement tool 12 which is able to precisely and mechanically measure the z-distance, in this case the distance between the lens 2 and the image sensor 5. The mechanical measurement tool 12 may be in accordance with a conventional laser-based precision distance measurement technique. In addition, the holder and its lens 2 are allowed to be moveable in the test fixture, under control of an actuator 11. The latter may be a manual actuator such as a precision screw drive mechanism that allows extremely small movements of the lens holder. Such movements are on the order of those expected to appear due to an unintentional disturbance to the test fixture and/or an installed DUT (e.g., during high volume manufacture testing). The image sensor 5 is coupled to provide its output data to a pixel distance calculator 8, similar to the one used in the pixel processing unit 7 of FIG. 1. Each pair of computed or estimated pixel distance value $y_i$ and measured z-distance value $z_i$ is then fed as a data point, to a best-fit curve finder 13. Several such data points are obtained (as the actuator 11 moves the lens holder to slightly different positions, or as the lens is "swept" along the optical axis). Once a sufficient number of data points have been collected, the curve finder 13 may compute the best-fit curve, e.g. using conventional curve fitting techniques. In other words, based on a collection of the experimental data points, generated by the mechanical measurement tool 12 and the pixel distance calculator 8, a curve is fit to the data points, e.g. in the manner illustrated by the graph of FIG. 4. The resulting best fit curve (mathematical relationship) is then stored to be reused during high volume manufacture testing of production specimens of the camera component, without the need for the mechanical measurement tool 12 and without the presence of the actuator 11 (in other words, an arrangement similar to the arrangement in FIG. 1).

As explained above, an embodiment of the invention may be a machine-readable medium (such as microelectronic memory) having stored thereon instructions, which program one or more data processing components (generically referred to here as a "processor") to perform the digital pixel processing operations described above including low pass filtering or image smoothing, centroid calculation, and other math functions. In other embodiments, some of these operations might be performed by specific hardware components that contain hardwired logic (e.g., dedicated digital filter blocks). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the fixed target depicted in FIG. 1 is a rectangular light frame on a dark background, other targets and their constituent objects (having different shapes) are possible. Also, while z-distance is depicted in FIG. 1 and in FIG. 5 as the distance between the image sensor (at the focal plane) and a lens, an alternative definition may be the distance between the lens and the fixed target, or between the lens and some other fixed point in the system that can be mechanically measured (preferably along the optical axis as shown). While other z-distance definitions are possible (e.g. a distance that is not along the optical axis as shown in the figures), it is expected that a z-distance as measured along the optical axis may be the most practical way to determine whether or not the lens has shifted. The description is thus to be regarded as illustrative instead of limiting.

What is claimed is:

1. A method for testing an optical characteristic of a camera component, comprising:

a) capturing a digital image of a plurality of objects that appear in an imaging target, while an optical image of the objects is formed through the camera component;
b) low pass filtering a group of pixels of the digital image that represent portions of the objects;
c) analyzing the filtered group of pixels to compute a pixel distance between a first subgroup of pixels that represents a portion of one of the objects, and a second subgroup of pixels that represents a portion of another of the objects; and
d) converting the pixel distance into a true distance using a predetermined math relationship that relates a pixel distance variable with a true distance variable.

2. The method of claim 1 wherein the true distance variable gives the distance between a lens of the camera component and a digital image sensor used to capture the image.

3. The method of claim 1 wherein the group of pixels is a plurality of pixel rows of the image.

4. The method of claim 3 wherein the low pass filtering produces a single row of pixel values that contain portions of the objects.

5. The method of claim 1 wherein analyzing the filtered group of pixels comprises calculating a centroid of the first subgroup of pixels, and a centroid of the second subgroup of pixels, wherein the computed pixel distance is the distance between the centroids.

6. The method of claim 1 further comprising:
signaling an alert when the converted true distance differs from an expected true distance.

7. The method of claim 6 further comprising:
repeating an imaging performance test of the camera component in response to the alert.

8. The method of claim 6 wherein the converted true distance is an initial value computed just after the camera component has been installed in a test fixture, the method further comprising repeating a)-d) to compute the expected true distance.

9. A system for testing an optical characteristic of a camera component, comprising:
a test fixture in which the camera component is to be installed;
a target which has a plurality of objects and is located such that the camera component as installed is aimed at the target; and
a test computer that signals an image sensor to capture an image of the objects in the target, low pass filters a group of pixels of the image that represent portions of the objects, analyzes the filtered group of pixels to compute a pixel distance between a first subgroup of pixels that represents a portion of one of the objects, and a second subgroup of pixels that represents a portion of another of the objects, and converts the pixel distance into a true distance using a predetermined math relationship that relates a pixel distance variable with a true distance variable.

10. The system of claim 9 wherein the test fixture is to receive a camera component that has an imaging lens installed in a lens holder.

11. The system of claim 10 wherein the test fixture is to receive a camera module that has said image sensor integrated with the lens holder in a camera module.

12. The system of claim 10 wherein the test computer is to signal an alert when the converted true distance differs from an expected true distance.

13. The system of claim 10 wherein the true distance variable refers to distance between the imaging lens and the image sensor.

14. An article of manufacture comprising:
a non-transitory machine-readable medium having stored therein instructions that when executed by a processor signal a camera module under test to capture an image of a target, low pass filter a group of pixels of the image that represent portions of a plurality of objects in the target, analyze the filtered group of pixels to compute a pixel distance between a first subgroup of pixels that represents a portion of one of the objects, and a second subgroup of pixels that represents a portion of another one of the objects, and convert the pixel distance into a true distance using a predetermined math relationship that relates a pixel distance variable with a true distance variable.

15. The article of manufacture of claim 14 wherein the instructions program the processor to signal an alert when the converted true distance differs from an expected true distance.

16. The article of manufacture of claim 15 wherein the true distance variable refers to distance between an imaging lens in the camera module under test and an image sensor in the camera module.

17. The article of manufacture of claim 14 wherein the instructions program the processor to analyze the filtered group of pixels by calculating a centroid of the first subgroup of pixels, and a centroid of the second subgroup of pixels, and wherein the computed pixel distance is the distance between the centroids.

* * * * *